United States Patent
Minei et al.

(10) Patent No.: US 7,567,512 B1
(45) Date of Patent: Jul. 28, 2009

(54) TRAFFIC ENGINEERING USING EXTENDED BANDWIDTH ACCOUNTING INFORMATION

(75) Inventors: Ina Minei, Santa Clara, CA (US); Pedro R. Marques, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 832 days.

(21) Appl. No.: 10/928,572

(22) Filed: Aug. 27, 2004

(51) Int. Cl.
*H04L 12/26* (2006.01)
*H04J 3/16* (2006.01)

(52) U.S. Cl. .................... 370/232; 370/236.1; 370/252; 370/468

(58) Field of Classification Search ......... 370/229–232, 370/235, 236, 236.1, 237, 252, 253, 400, 370/401, 464, 465, 468
See application file for complete search history.

(56) References Cited

U.S. PATENT DOCUMENTS

| | | | |
|---|---|---|---|
| 6,363,319 B1 | 3/2002 | Hsu | |
| 6,538,416 B1 | 3/2003 | Hahne et al. | |
| 6,956,821 B2 * | 10/2005 | Szviatovszki et al. | 370/237 |
| 7,031,312 B1 | 4/2006 | Jayakumar et al. | |
| 7,039,706 B1 | 5/2006 | Parker et al. | |
| 7,065,084 B2 | 6/2006 | Seo | |
| 7,082,102 B1 | 7/2006 | Wright | |
| 7,164,679 B2 | 1/2007 | Kotha et al. | |
| 7,317,731 B2 | 1/2008 | Seddigh et al. | |
| 7,336,617 B1 * | 2/2008 | Liu | 370/252 |
| 2003/0028670 A1 | 2/2003 | Lee et al. | |
| 2003/0028818 A1 | 2/2003 | Fujita | |
| 2003/0103510 A1 | 6/2003 | Svanberg et al. | |
| 2003/0108051 A1 | 6/2003 | Bryden et al. | |
| 2003/0117950 A1 | 6/2003 | Huang | |
| 2003/0137971 A1 | 7/2003 | Gibson et al. | |
| 2003/0210705 A1 | 11/2003 | Seddigh et al. | |
| 2004/0004955 A1 | 1/2004 | Lewis | |
| 2004/0010617 A1 | 1/2004 | Akahane et al. | |
| 2004/0042398 A1 * | 3/2004 | Peleg et al. | 370/230 |
| 2005/0010685 A1 | 1/2005 | Ramnath et al. | |
| 2005/0013242 A1 | 1/2005 | Chen et al. | |
| 2005/0125490 A1 | 6/2005 | Ramia | |
| 2005/0169270 A1 | 8/2005 | Mutou et al. | |
| 2005/0169313 A1 | 8/2005 | Okamura et al. | |
| 2005/0265258 A1 | 12/2005 | Kodialam et al. | |
| 2006/0013232 A1 | 1/2006 | Xu et al. | |

(Continued)

OTHER PUBLICATIONS

D. Awduche et al., "RFC 3209—RSVP-TE: Extensions to RSVP for LSP Tunnels," Network Working Group, Dec. 2001, 47 pgs.

(Continued)

*Primary Examiner*—Aung S Moe
*Assistant Examiner*—Kerri M Rose
(74) *Attorney, Agent, or Firm*—Shumaker & Sieffert, P.A.

(57) ABSTRACT

A system distributes extended traffic accounting information of bandwidth availability on links throughout a network. For example, routers within the network utilize an extended reservation protocol to calculate bandwidth availability information for links. In calculating the bandwidth availability information, the extended reservation protocol accounts for not only the amount of bandwidth reserved on each of links via the resource reservation protocol itself, but also for the bandwidth usage by other traffic on the links, such as Label Distribution Protocol (LDP) traffic or Internet Protocol (IP) traffic. The routers exchange bandwidth availability information using a routing protocol to gain network-wide knowledge of bandwidth availability.

34 Claims, 8 Drawing Sheets

U.S. PATENT DOCUMENTS

| | | |
|---|---|---|
| 2006/0039364 A1 | 2/2006 | Wright |
| 2006/0039391 A1 | 2/2006 | Vasseur et al. |
| 2006/0126536 A1 | 6/2006 | Patel et al. |
| 2006/0182119 A1 | 8/2006 | Li et al. |
| 2006/0233137 A1 | 10/2006 | Dantu et al. |
| 2007/0268909 A1 | 11/2007 | Chen et al. |

OTHER PUBLICATIONS

RSVP-TE: Resource Reservation Protocol—Traffic Extension, Javvin Company, 2 pgs, printed Feb. 14, 2005.

U.S. Appl. No. 10/860,183, entitled "Constraint-Based Label Switched Path Selection Within A Computer Network," filed Jun. 3, 2004.

U.S. Appl. No. 10/963,412, entitled "Automatic LSP Stitching With Protocol Signaling," filed Oct. 12, 2004.

U.S. Appl. No. 10/973,677, entitled "RSVP-Passive Interfaces For Traffic Engineering Peering Links In MPLS Networks," filed Oct. 26, 2004.

* cited by examiner

| LINK # | EXT RSVP | MAX CAPACITY | PRIORITY [0] | PRIORITY [1] | ... | PRIORITY [7] |
|---|---|---|---|---|---|---|
| LINK 1 | Y | 200 | 150 Mbps | 100 Mbps | | 100 Mbps |
| LINK 2 | Y | 200 | 200 Mbps | 50 Mbps | | 50 Mbps |
| LINK 3 | N | 300 | 225 Mbps | 150 Mbps | | 100 Mbps |
| LINK 4 | Y | 200 | 175 Mbps | 150 Mbps | | 150 Mbps |
| LINK 5 | Y | 300 | 300 Mbps | 200 Mbps | | 0 Mbps |

FIG. 4

TRAFFIC ENGINEERING USING EXTENDED BANDWIDTH ACCOUNTING INFORMATION

TECHNICAL FIELD

The invention relates to computer networks and, more particularly, to providing traffic engineering within a network.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the network, routers exchange routing information in accordance with a defined routing protocol, such as the Border Gateway Protocol (BGP).

The term "link" is often used to refer to the connection between two devices on a network is generally referred to as a link. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction.

As networks grow in size and complexity, the traffic on any given link (virtual or physical) may approach a maximum bandwidth capacity for the link, thereby leading to congestion and poor throughput. As congestion increases, a service provider may upgrade capacity on the link in order to avoid the congestion. For example, a service provider may upgrade the link with a larger capacity link upon the amount of traffic on the link exceeding a threshold, such as 70% of the maximum capacity. A link upgrade, however, is often a lengthy process, and in some situations the traffic may increase and reach the maximum capacity before the upgrade is complete. In these situations, traffic may be delayed or even dropped.

In order to avoid these problems, the service provider may attempt to traffic engineer a temporary fix to reroute at least a portion of the traffic from the congested link. One approach typically employed in an attempt to temporarily alleviate the congestion is to manually manipulate routing metrics associated with the link in hopes of causing at least some traffic to be routed around the link. Manipulating metrics associated with the link, however, often has unpredictable network-wide ramifications.

SUMMARY

In general, extended traffic accounting techniques are described for achieving accurate available bandwidth information for links within a network. The extended accounting techniques may be useful in a variety of network environments, including network environments having a mixture of traffic. For example, the techniques may be useful in networks having traffic associated with a resource reservation protocol, such as the Resource Reservation Protocol with Traffic Engineering extensions (RSVP-TE), as well as traffic associated with other types of protocols, such as the Label Distribution Protocol (LDP) or the Internet Protocol (IP). The techniques may be especially useful for traffic engineering a temporary path around a congested link in such a network until such time as the congested link can be upgraded.

A network device, such as a router, within the network utilizes the techniques to more accurately determine bandwidth availability information for links within the network. In determining the bandwidth availability information, the network device may utilize a resource reservation protocol that has been extended as described herein to account for the amount of bandwidth currently reserved on each of the link as well as the current bandwidth usage by other traffic, such as LDP or IP traffic. In this manner, the extended resource reservation protocol achieves a more accurate accounting of bandwidth availability for each of the links.

In operation, the network device supporting the extended reservation protocol monitors reservation requests to track the amount of bandwidth reserved for links (virtual or physical) associated with the network device. For example, the extended reservation protocol may monitor the current bandwidth reserved for RSVP-TE traffic. Additionally, the network device maintains traffic statistics to track unreserved bandwidth currently consumed by the other forms of traffic, such as LDP, IP, or other types of traffic. For example, the network device may include a traffic analysis module that monitors traffic output on each outbound link associated with the router, and generates statistics to reflect the bandwidth consumption for the traffic. The network device calculates the amount of bandwidth available on each its outbound links using the traffic statistics and the tracked bandwidth reservations. The network device may, for example, calculate the bandwidth availability information by subtracting an average of the amount of bandwidth reserved by bandwidth reservations and the current traffic associated with other protocols from the total capacity of each of the outbound links. In this manner, when determining the amount of bandwidth available on each of the links, the network device supporting the extended reservation protocol accounts for bandwidth reserved for certain types of traffic, such as RSVP-TE traffic, as well as unreserved bandwidth currently being consumed by other forms of traffic.

The network device advertises the extended bandwidth availability information throughout the network via one or more link-state routing protocols, such as such as Open Shortest Path First (OSPF) or Intermediate System—Intermediate System (ISIS). In addition, the network device receives bandwidth availability information from other network devices and maintains a traffic engineering data structure (TED), e.g., a database. Thus, the network device utilizes the extended reservation protocol in conjunction with the routing protocol to generate accurate bandwidth availability information for each of the links of the network. The network device may additionally advertise support for the techniques described herein and, more particularly, that the bandwidth availability information for a particular link represents extended accounting information. As a result, when selecting paths, network devices that support the techniques described herein can identify those links for which extended bandwidth availability accounting has been performed, and can utilize the information to improve the path selection process.

For example, in response to detecting a congested link, a router, system administrator or software agent invokes the extended resource reservation protocol to identify a new path through the network based on the bandwidth availability information within the TED, and reroutes traffic via the newly identified path. Particularly, the extended resource reservation protocol utilizes the extended bandwidth availability information within the TED to identify a path in which each of the links along the route has sufficient available bandwidth to support the amount of traffic to be rerouted. In this manner, the router can redirect traffic from the congested link with a reduced likelihood of simply transferring the congestion to a different link.

In one embodiment, a method comprises calculating an amount of bandwidth available on a link associated with a router. The calculation accounts for reserved bandwidth associated with the link and unreserved bandwidth utilized by traffic on the link. The method further comprises outputting a routing communication to communicate the amount of bandwidth available on the link to a router via a routing protocol.

In another embodiment, a router comprises a resource reservation protocol executing within a control unit. The resource reservation protocol calculates an amount of bandwidth available on a link associated with the router based on reserved bandwidth associated with the link and unreserved bandwidth utilized by at least a portion of traffic on the link. The router further comprises a routing protocol executing within the control unit that advertises the calculated of bandwidth available on the link to other routers of a network.

In another embodiment, a computer-readable medium comprises instructions that cause a processor to calculate an amount of bandwidth available on a link associated with a router. The calculation accounts for reserved bandwidth of the link and current network traffic on the link that is not associated with the reserved bandwidth. The computer readable medium further comprises instructions to advertise the amount of bandwidth available on the link to other routers of the network.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an exemplary traffic engineering data structure maintained by the router of FIG. 3.

DETAILED DESCRIPTION

Figure 1:
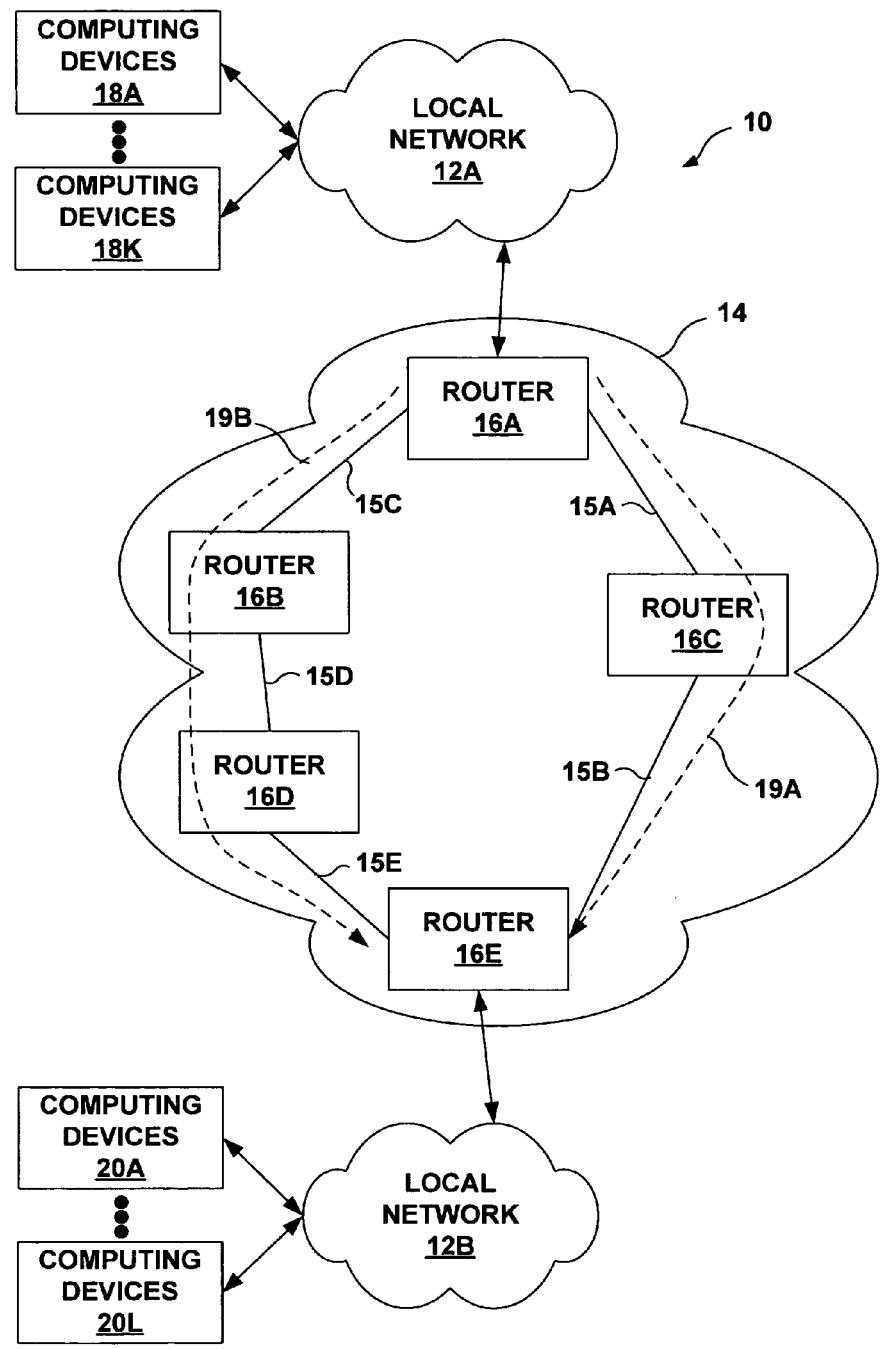
FIG. 1 is a block diagram illustrating an exemplary system that utilizes an extended reservation protocol to gain network-wide knowledge of availability of bandwidth through network.

FIG. 1 is a block diagram illustrating an exemplary system 10 that utilizes a resource reservation protocol that has been extended in accordance with the techniques described herein in conjunction with a routing protocol to gain more accurate knowledge of bandwidth availability for each of links 15A-15E (collectively, "links 15") within a network 14. As will be described in detail, the resource reservation protocol implemented by system 10 has been extended to account for not only the amount of bandwidth reserved on each of links 15 via the resource reservation protocol itself, but for the bandwidth usage by other forms of traffic. For example, the resource reservation protocol traffic may maintain accurate bandwidth accounting information that accounts for traffic associated with the resource reservation protocol, such as RSVP-TE traffic, as well as traffic associated with other types of protocols, such as the LDP or the IP traffic.

Network devices, such as routers 16A-16E (collectively, "routers 16"), exchange the bandwidth availability information with one another for use in traffic engineering purposes. For example, routers 16 may utilize the bandwidth availability information to dynamically reroute traffic to alleviate network link congestion or offload traffic during link maintenance. In addition, a system administrator or software agent may utilize the bandwidth availability information for these or other traffic engineering purposes.

In the example of FIG. 1, system 10 includes local networks 12A and 12B (collectively, "local networks 12") that support a resource reservation protocol, such as Resource Reservation Protocol with Traffic Engineering extensions (RSVP-TE). RSVP-TE, for example, is a protocol that enables the reservation of resources and establishment of label switched paths (LSPs) for packet flows from a source device to a destination device. Although described for exemplary purposes in reference to RSVP-TE, other resource reservation protocols may be extended in a similar manner to provide a more accurate accounting of bandwidth availability within a network.

Routers 16A and 16E couple local networks 12A and 12B, respectively, to network 14. Local networks 12 include a number of computing devices. As illustrated in FIG. 1, local network 12A includes computing devices 18A-18K (collectively, "computing devices 18") and local network 12B includes computing devices 20A-20L (collectively, "computing devices 20"). Example computing devices 18, 20 include workstations, servers, laptops, personal digital assistants (PDAs), wireless devices, and the like.

Network 14 represents an intermediate network coupling local networks 12. Network 14 may, for example, be a service provider network that provides access to the Internet or other private or public networks (not shown). Routers 16 may be edge routers of a service provider network, or may be core routers, enterprise routers or other devices that include routing functionality.

Local networks 12 and/or network 14 may support multiple networks and, therefore, may carry packets associated with a variety of protocols. For example, local networks 12 and/or network 14 may carry traffic associated with reserved bandwidth, e.g., via the RSVP-TE protocol as extended herein, and may carry packets that consume unreserved bandwidth, e.g., LDP or IP traffic. In some embodiments, network 14 may invoke the extended resource reservation protocol only as needed to traffic engineer a temporary path around a congested link, and may otherwise primarily carry traffic associated with unreserved bandwidth, e.g., IP traffic and/or LDP traffic.

Routers 16 supporting the extended reservation protocol described herein monitor reservation requests to track the amount of bandwidth reserved for links 15. For example, router 16A tracks the amount of bandwidth reserved outbound traffic on links 15A and 15C, e.g., traffic carried by LSPs established via the RSVP-TE protocol. In accordance with the principles of the invention, routers 16 may also track bandwidth usage by other forms of traffic for which resources have not been reserved, such as LDP, IP, or other types of traffic. In this manner, routers 16 supporting the extended reservation protocol account for reserved bandwidth as well as current traffic carried by the routers for which resources have not been reserved when determining the amount of bandwidth available on each of links 15.

Routers 16 exchange the collected bandwidth availability information via a routing protocol. For example, routers 16 may exchange the bandwidth availability information for each of links 15 as link state information via a link-state interior routing protocol, such as the Open Shortest Path First (OSPF) or Intermediate System—Intermediate System (ISIS) routing protocols. In this manner, routers 16 use the extended reservation protocol in conjunction with the routing protocol to gain accurate, network-wide knowledge of bandwidth availability on each of links 15 of network 14. As a result, routers 16, or system administrators or software agents associated with the routers, can more intelligently select paths within network 14. For example, in response to detecting a congested link, one of routers 16 or a system administrator may invoke the extend resource reservation protocol to identify a new path through network 14 based on the bandwidth availability information, and reroute traffic via the newly identified path. For instance, upon detecting congestion on link 15A, router 16A may utilize the extended resource reservation protocol to establish LSP 19B and reroute traffic from LSP 19A to LSP 19B. Although described in reference to physical links for ease of illustration, the techniques may readily be applied to virtual links.

Figure 2:
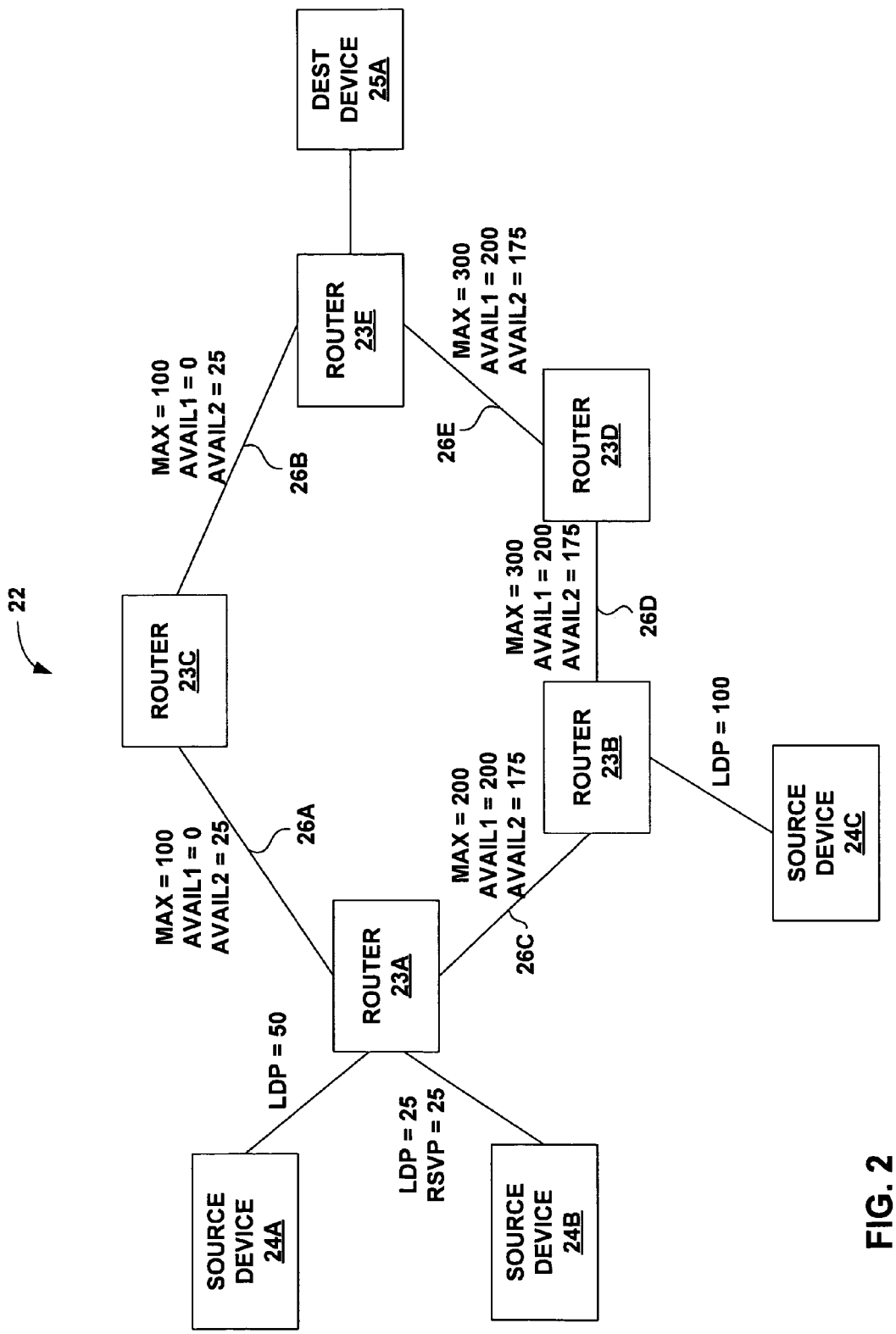
FIG. 2 is a block diagram illustrating another exemplary system in which routers compute and advertise bandwidth availability information in accordance with the principles of the invention.

FIG. 2 is a block diagram illustrating another exemplary system 22 in which routers 23A-23E (collectively, "routers 23") compute and advertise bandwidth availability information in accordance with the principles of the invention. Although FIG. 2 is described with reference to RSVP-TE traffic and LDP traffic, the techniques can be applied to include other types of network traffic, such as IP traffic, in calculating more accurate bandwidth availability information. For purposes of illustration, it will be assumed that network traffic only traverses system 22 from source devices 24A-24C (collectively, "source devices 24") toward destination device 25. However, in real-world applications, there will likely be additional links to allow network traffic to flow in both directions.

In FIG. 2, a maximum traffic capacity of each of links 26A-26E (collectively, "links 26") is indicated adjacent to the respective link and labeled "MAX." For example, links 26A and 26B have maximum traffic capacities of 100 Mbps, link 26C has a maximum traffic capacity of 200 Mbps, and links 26D and 26E have maximum traffic capacities of 300 Mbps.

Source devices 24, which may, for example, be computing devices 18, 20 of local networks 12 (see FIG. 1), input traffic into the network. In this example, source device 24A sends 50 Mbps of traffic not associated with reserved resources (e.g., LDP traffic) to destination device 25 via an LSP (not shown) established through links 26A and 26B. Source device 24B sends 25 Mbps of LDP traffic not associated with reserved resources to destination device 25 via the LSP utilizing links 26A and 26B, and also has an additional 25 Mbps reserved along the LSP for traffic associated with reserved resources (e.g., RSVP-TE traffic in this example). In this example, the traffic injected by source device 24A and 24B follows the shortest path as calculated by a link state routing protocol, e.g., OSPF or ISIS, and, for this reason, flows to destination device 25A via links 26A and 26B. In addition, source device 24C sends 100 Mbps of LDP traffic not associated with reserved resources to destination device 25 via an LSP (not shown) that flows through links 26D and 26E.

In accordance with the principles described herein, each of routers 23 calculates the amount of bandwidth available on associated links 26, accounting for bandwidth usage by the LDP traffic not associated with reserved resources as well as bandwidth reserved for RSVP-TE traffic. For example, router 23A calculates the amount of bandwidth available on links 26A and 26C to be 0 Mbps and 200 Mbps, respectively. The bandwidth availability for link 26A is calculated as 0 Mbps since link 26A has a maximum bandwidth of 100 Mbps and has 75 Mbps of LDP traffic not associated with reserved resources and 25 Mbps of RSVP-TE traffic. The bandwidth availability for link 26C is calculated as 200 Mbps since, at this period in time, link 26C has no current LDP traffic and no reserved bandwidth for RSVP-TE traffic. The bandwidth availability information calculated for each of links 26 at this first period in time is illustrated in FIG. 2 as "AVAIL1."

Routers 23 advertise the calculated bandwidth availability information at this period in time (AVAIL1) via a routing protocol as link state information associated with each of links 26. Each of routers 23 receives bandwidth availability information from the other routers via the routing protocol, and stores the information in a respective traffic engineering database (TED). Not all of routers 23 need support the described techniques, and may advertise whether or not the link state information associated with each of links 26 includes the extended bandwidth accounting information. As a result, routers 23 can identify other routers within system 22 that are able to account for current traffic bandwidth use as well as reserved bandwidth for future traffic in its bandwidth availability calculations. If a router without capability to support the extended reservation protocol calculated the bandwidth availability statistics, the bandwidth availability statistics advertised by that router may be ignored in identifying a new path through system 22.

Because the loads on links 26A and 26B have reached their maximum capacity, as indicated by AVAIL1=0, a network administrator or software agent may elect to reroute some or all of the traffic to relieve congestion of links 26A and 26B. For example, the network administrator may elect to invoke the extended resource reservation protocol to temporarily reroute the RSVP-TE traffic to allow links 26A and 26B to be upgraded to larger capacity links. As another example, the system administrator may elect to permanently reroute a portion of the RSVP-TE traffic via a new or underutilized LSP such that no link upgrades need to be performed.

In either case, the system administrator of software agent executing on router 23A or another device, upon determining that links 26A and 26B are at or near capacity, invokes the extended resource reservation protocol. The extended resource reservation protocol uses the TED associated with router 23A to identify a path through system 22 with sufficient bandwidth to reroute traffic from the congested link. In particular, the extended resource reservation protocol utilizes the accurate bandwidth availability information collected by routers 23 in accordance with the techniques described herein to select a new path. In view of the information, the extended resource reservation protocol establishes a new LSP for at least a portion of the traffic on the congested links. In the example of FIG. 2, the extended resource reservation protocol may select and establish an LSP through underutilized links 26C-26E to reroute the RSVP-TE traffic associated with source device 24B. In this manner, the congestion on links 26A and 26B may be relieved.

Upon establishing the new LSP from router 23A to router 23E via links 26C, 26D and 26E, routers 23 recalculate the amount of bandwidth available on associated links 26. Routers 23 again account for both bandwidth usage by LDP traffic not associated with reserved resources as well as bandwidth reserved for RSVP-TE traffic. Router 23A, for example, calculates the amount of bandwidth available on links 26A and 26C to be 25 Mbps and 175 Mbps, respectively. The bandwidth availability for link 26A is calculated as 25 Mbps since link 26A has a maximum bandwidth of 100 Mbps and has 75 Mbps of LDP traffic from source devices 24A and 24B. LDP traffic from source devices 24A and 24B continue to flow through link 26A due to the fact that LDP traffic follows the shortest path as calculated by the link state routing protocol. The bandwidth availability for link 26C is calculated as 175 Mbps since, at this period in time, link 26C has 25 Mbps of RSVP-TE traffic that has been rerouted from source device 24B. Similarly, the bandwidth availability for links 26D and 26E is 175 Mbps once the RSVP-TE traffic has been rerouted. The bandwidth availability information calculated for each of links 26 after the rerouting of traffic is illustrated in FIG. 2 as "AVAIL2." Routers 23 advertise the newly calculated bandwidth availability information (AVAIL2) via routing communications in accordance with a routing protocol, and update their respective TEDs to maintain accurate knowledge of bandwidth availability throughout system 22.

Figure 3:
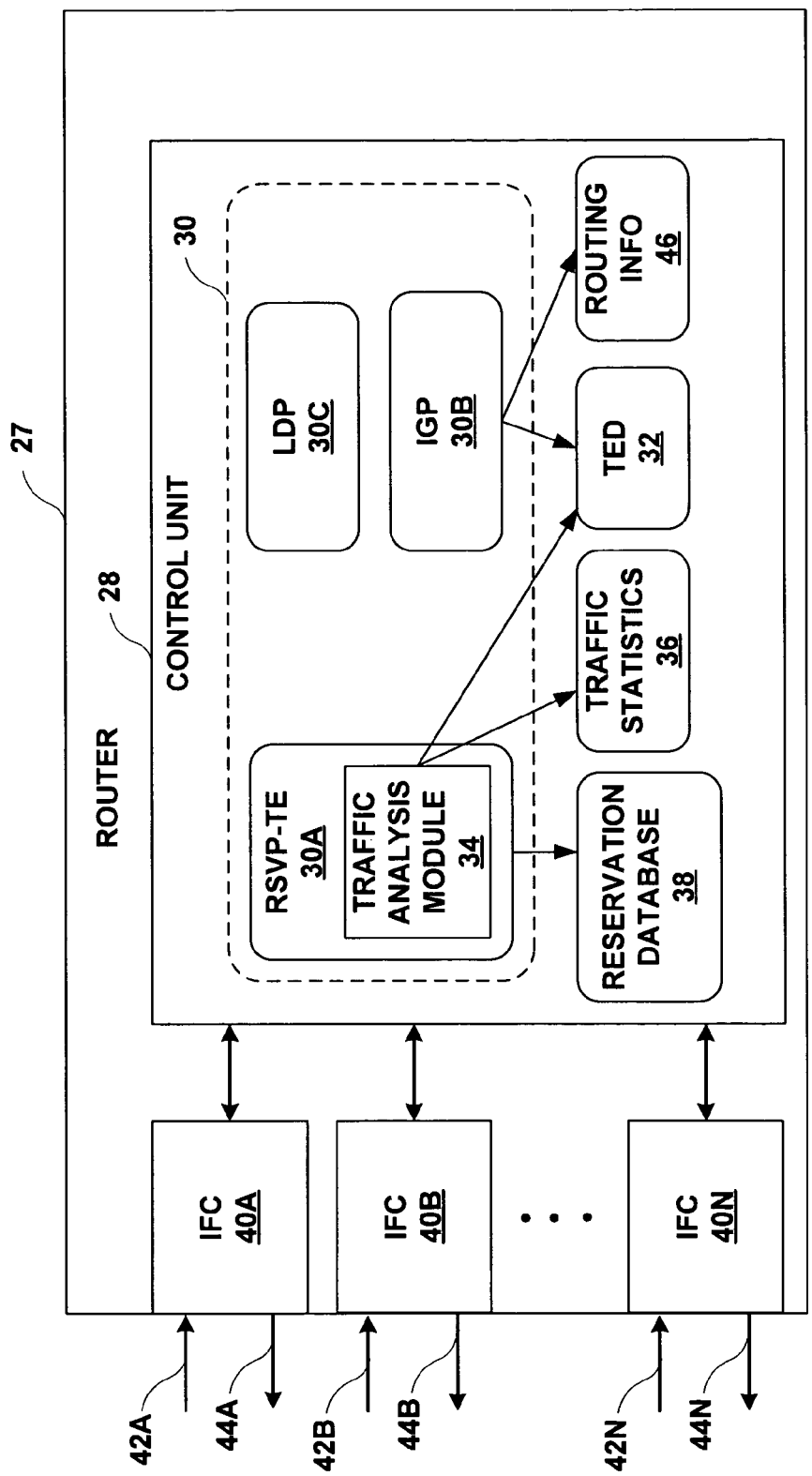
FIG. 3 is a block diagram illustrating an exemplary router supporting the extended reservation protocol used to more accurately calculate bandwidth availability of links within the network.

FIG. 3 is a block diagram illustrating an exemplary router 27 which utilizes a reservation protocol that has been extended to accurately determine bandwidth availability based on current as well as reserved usage. Router 27 may, for example, represent any of routers 16 of FIG. 1 or routers 23 of FIG. 2.

In the example embodiment of FIG. 3, router 27 includes a set of interface cards (IFCs) 40A-40N (collectively, "IFCs 40") for communicating packets via inbound links 42A-42N (collectively, "inbound links 42") and outbound links 44A-44N (collectively, "outbound links 44"). Router 27 further comprises a control unit 28 that maintains routing information 46. Routing information 46 describes the topology of a network, such as network 14 of FIG. 1, and, in particular, routes through the network. Routing information 46 may include, for example, route data that describes various routes within the network, and corresponding next hop data indicating appropriate neighboring devices within the network for each of the routes. Router 27 updates routing information 46 to accurately reflect the topology of the network. In general, when router 27 receives a packet via one of inbound links 42, control unit 28 determines a destination and associated next hop for the packet in accordance with routing information 46 and outputs the packet on an outbound link 44 based on the destination.

Control unit 28 provides an operating environment for protocols 30A-30C ("protocols 30") executing within control unit 28. In this example, protocols 30 include a resource reservation protocol 30A ("RSVP-TE protocol 30A"), an interior gateway protocol 30B ("IGP protocol 30B"), such as OSPF or IS-IS, and a label distribution protocol 30C ("LDP protocol 30C"). RSVP-TE protocol 30A receives resource reservation requests from other routing devices, and reserves the requested bandwidth on outbound links 44 for RSVP-TE traffic. RSVP-TE protocol 30A tracks the bandwidth reservation requests in order to maintain accurate bandwidth availability information. RSVP-TE protocol 30A may, for example, receive a reservation request to reserve 100 Mbps of bandwidth in association with a particular network path. If available, RSVP-TE protocol 30A reserves that bandwidth on the appropriate one of outbound links 44, and records that reservation in reservation database 38 for use in processing future reservation requests to avoid reserving excess bandwidth on any given one of outbound links 44. Although described for exemplary purposes in reference to RSVP-TE, the principles described herein may by applied to extend any similar protocol, such as a different constraint-based routing protocol.

As illustrated in FIG. 3, RSVP-TE protocol 30A has been extended to include a traffic analysis module 34. Traffic analysis module 34 monitors traffic through router 27 that is not associated with reserved bandwidth (e.g., LDP or IP traffic) and generates traffic statistics 36. Traffic analysis module 34 may, for example, monitor the amount of LDP traffic being output on each of outbound links 44. In some embodiments, traffic analysis module 34 may control the granularity of traffic statistics 36. For example, in one embodiment, traffic analysis module 34 may only monitor and generate statistics for a total amount of LDP traffic being output from router 27 on each one of outbound links 44. In other embodiments, traffic analysis module 34 may, however, generate more granular traffic statistics by monitoring the different types of traffic. For example, traffic analysis module 34 may track the amount of LDP traffic output on each of outbound links 44 as well as the amount of IP traffic output on each of outbound links 44.

In accordance with the principles of the invention, RSVP-TE protocol 30A calculates the amount of bandwidth available on one or more outbound links 44 associated with router 27. In the example of FIG. 3, RSVP-TE protocol 30A calculates the available bandwidth using the statistics stored in traffic statistics 36, i.e., statistics for current consumption of non-reserved bandwidth, as well as the reservation requests stored in reservation database 38. In this manner, RSVP-TE protocol 30A accounts for both the amount of bandwidth reserved for RSVP-TE traffic and the amount of LDP or other traffic currently using bandwidth of outbound links 44. As a result, RSVP-TE protocol 30A may generate more accurate bandwidth availability information for each of outbound links 44. For each of outbound links 44, RSVP-TE protocol 30A may, for example, calculate the available bandwidth information by averaging the amount of LDP traffic over time, and subtracting the average LDP traffic and the amount of reserved bandwidth from a total capacity associated with each of the links. Alternatively, or in addition, the techniques may be used to account for IP traffic or other traffic output on outbound links 44 that is not associated with reserved resources. For example, for each of outbound links 44, traffic analysis module 34 may monitor the IP traffic, and RSVP-TE protocol 30A calculates an average amount of IP traffic over a defined period. RSVP-TE protocol 30A calculates the available bandwidth by taking the capacity of the link minus the monitored traffic statistics minus the RSVP reservations. RSVP-TE protocol 30A stores the calculated bandwidth availability information in a traffic engineering data structure 32 ("TED 32") or other suitable data structure.

RSVP-TE protocol 30A advertises the calculated bandwidth availability information of TED 32 to other routing devices as link state information via a routing protocol, such as IGP protocol 30B. In addition, IGP protocol 30B receives bandwidth availability information from the other routing devices, and updates TED 32 with the received bandwidth availability information. In this manner, router 27 maintains accurate bandwidth availability information for outbound links 44 for an entire network, e.g., network 14 of FIG. 1. This allows traffic engineering to be performed on real-time network statistics instead of simulated network models.

Furthermore, TED 32 may include data indicative of which other routers in the network support the extended reservation protocol and, in particular, whether the accounting information associated with each of the links includes extended bandwidth availability information described herein. In this manner, router 27 can identify which bandwidth availability information was calculated by routers supporting the capability to account for LDP or other types of traffic in its bandwidth availability calculations. If the router calculating bandwidth availability information for a particular link does not support the extended reservation protocol, the bandwidth availability information generated by that router may be ignored when selecting paths that satisfy a requested bandwidth requirement.

When establishing a new path, a system administrator or software agent invokes RSVP-TE protocol 30A to identify the new path based on the bandwidth allocation information maintained within TED 32. For example, in the event traffic needs to be rerouted from a congested link, a path is selected that has sufficient bandwidth for all or a portion of the traffic of the congested link. RSVP-TE protocol 30A may also preselect a path before the path is needed. RSVP-TE protocol 30A (or a system administrator or a software agent) accesses TED 32 and identifies a path in which each link along the path has sufficient bandwidth to support the additional traffic. RSVP-TE protocol 30A may, for example, dynamically determine another path through the network based on TED 32 and route traffic along this new path. If the new path has not been previously established, RSVP-TE protocol 30A establishes the new path (e.g., an LSP) through the network.

Although described in reference to RSVP-TE, the techniques may be applied to other resource reservation protocols, constraint-based routing protocols, or QoS signaling methods, such as protocols from the Next Steps in Signaling (NSIS) working group of the Internet Engineering Task Force (IETF). Furthermore, although described in reference to IGP, the techniques for advertising the bandwidth availability information may be performed by other routing protocols capable of communicating (or which can be extended to communicate) the extended bandwidth accounting information.

In addition, although illustrated in FIG. 3 as a part of router 27, traffic analysis module 34 may execute within a separate device. In that case, router 27 may receive traffic statistics from the external traffic analysis module for optional storage as traffic statistics 36. Alternatively, router 27 may simply request traffic statistics from the external traffic analysis module when needed to compute bandwidth availability information.

The architecture of router 27 illustrated in FIG. 3 is shown for exemplary purposes only. The invention is not limited to this architecture. In other embodiments, router 27 may be configured in a variety of ways. In one embodiment, for example, control unit 28 and its corresponding functionality may be distributed within IFCs 40. In another embodiment, control unit 28 may include a routing engine that performs route resolution and maintains a routing information base (RIB), e.g., routing information 46, and a forwarding engine that performs packet forwarding based on a forwarding information base (FIB) generated in accordance with the RIB.

Control unit 28 may be implemented solely in software, or hardware, or may be implemented as a combination of software, hardware, or firmware. For example, control unit 28 may include one or more processors which execute software instructions. In that case, the various software modules of control unit 28, such as protocols 30, may comprise executable instructions stored on a computer-readable medium, such as computer memory or hard disk.

FIG. 4 is a block diagram illustrating an exemplary traffic engineering data structure 32 maintained by router 27 (FIG. 3). As described above, a reservation protocol, such as RSVP-TE protocol 30A, has been extended to generate traffic engineering data structure 32 based on reservation database 38 and traffic statistics 36. The techniques may be used to provide extended accounting information when the reservation protocol supports priority levels and, in particular, the assignment of priorities to different LSPs.

In the exemplary embodiment illustrated in FIG. 4, traffic engineering data structure 32 is a table in which each row represents a particular link 44 (FIG. 3) within network 14. For each link 44, traffic engineering data structure 32 may include an indicator 52 of whether or not a corresponding router that performed the bandwidth availability calculations for that particular link supports the extended reservation protocol described herein. In addition, each row of traffic engineering data structure 32 includes a maximum traffic capacity of the link and a currently available bandwidth capacity for each level of priority, e.g., priority levels 0-7.

When calculating the currently available bandwidth for each level of priority, the extended resource reservation protocol accounts for traffic associated with unreserved resources (e.g., LDP or IP traffic) as the highest priority due to the fact that the traffic cannot be rerouted. As a result, the extended resource reservation protocol generates the available bandwidth information for the highest priority (e.g., priority zero in this example) to account for bandwidth reserved at that level for each link as well as current traffic on each link that is not associated with the reserved bandwidth. For each of the lower priority levels, the extended resource reservation protocol accounts for bandwidth reserved at that level as well as the higher priority levels. For example, assume that the extended resource reservation protocol determines that link 1 is currently experiencing 50 Mbps of LDP traffic that utilizes unreserved resources, and that another 50 Mbps of bandwidth has been reserved at priority level 1. Consequently, the extended resource reservation protocol determines that 150 Mbps of bandwidth is available at priority level zero (200 Mbps-50 Mbps of LDP traffic), and that 100 Mbps is available at each priority level 1-7 (200 Mbps-50 Mbps of LDP traffic-50 Mbps reserved bandwidth).

As described above, a system administrator or software agent may select a new path based on the information contained in traffic engineering data structure 32. RSVP-TE protocol 30A, for example, may identify a path having a sufficient amount of bandwidth available on each link from a source device to a destination device for a requested priority level. The data of FIG. 4 is illustrated for exemplary purposes, and may be readily varied. For example, the traffic engineering data structure 32 may identify the formula used by the router associated with each of the links, the types of traffic accounted for (e.g., LDP traffic only or LDP and IP traffic), and the other information. Moreover, the form of traffic engineering data structure 32 may comprise one or more tables, arrays, linked lists, databases, files or other suitable data structures.

Figure 5:
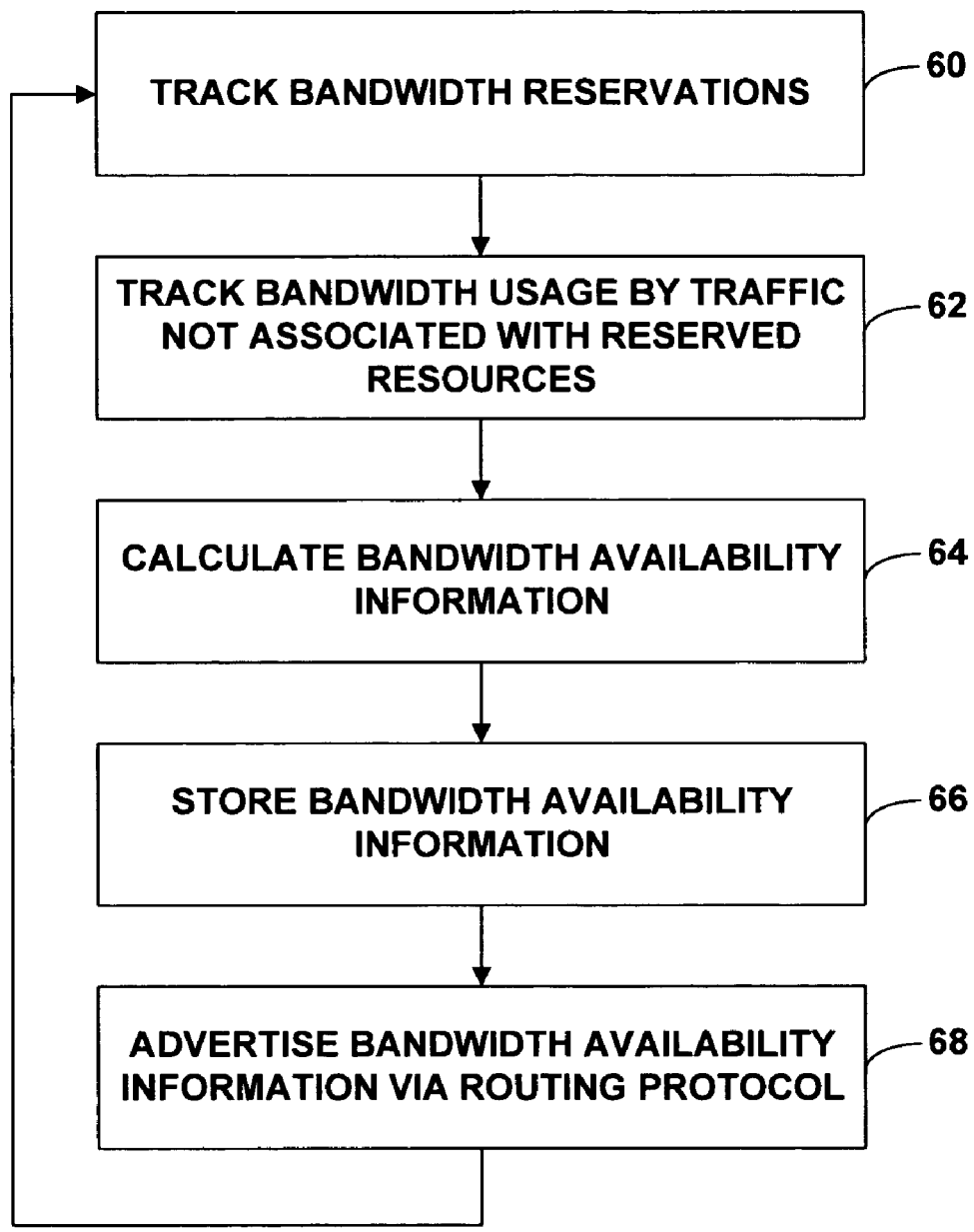
FIG. 5 is a flow diagram illustrating exemplary operation of the router when utilizing the extended reservation protocol to determine bandwidth availability of its outbound links.

FIG. 5 is a flow diagram illustrating exemplary operation of a router, such as router 27 of FIG. 3, utilizing an extended reservation protocol to determine bandwidth availability of its outbound links 44. Initially, router 27 tracks the amount of bandwidth reserved on each of outbound links 44 (60). Router 27 may, for example, maintain a reservation database, e.g., reservation database 38, that indicates the amount of bandwidth reserved for each of outbound links 44.

Router 27 also tracks the bandwidth usage by traffic not associated with reserved resources flowing through the router (62). Router 27 may monitor traffic on outbound links 44 using a traffic analysis module 34 and generate traffic statistics 36 based on the monitored traffic. Alternatively, router 27 may receive traffic statistics from an external traffic analysis module. RSVP module 30A calculates the amount of bandwidth available on each of outbound links 44 using both reservation database 38 and traffic statistics 36 (64). In this manner, router 27 accounts for both the traffic usage of outbound links 44 not associated with reserved resources as well as the bandwidth usage by reserved traffic.

Router 27 stores the calculated bandwidth availability information in TED 32 (66), and advertises the bandwidth availability information to other routers throughout the network (68). For example, router 27 may distribute the bandwidth availability information via a link state routing protocol, such as OSPF or IS-IS.

Figure 6:
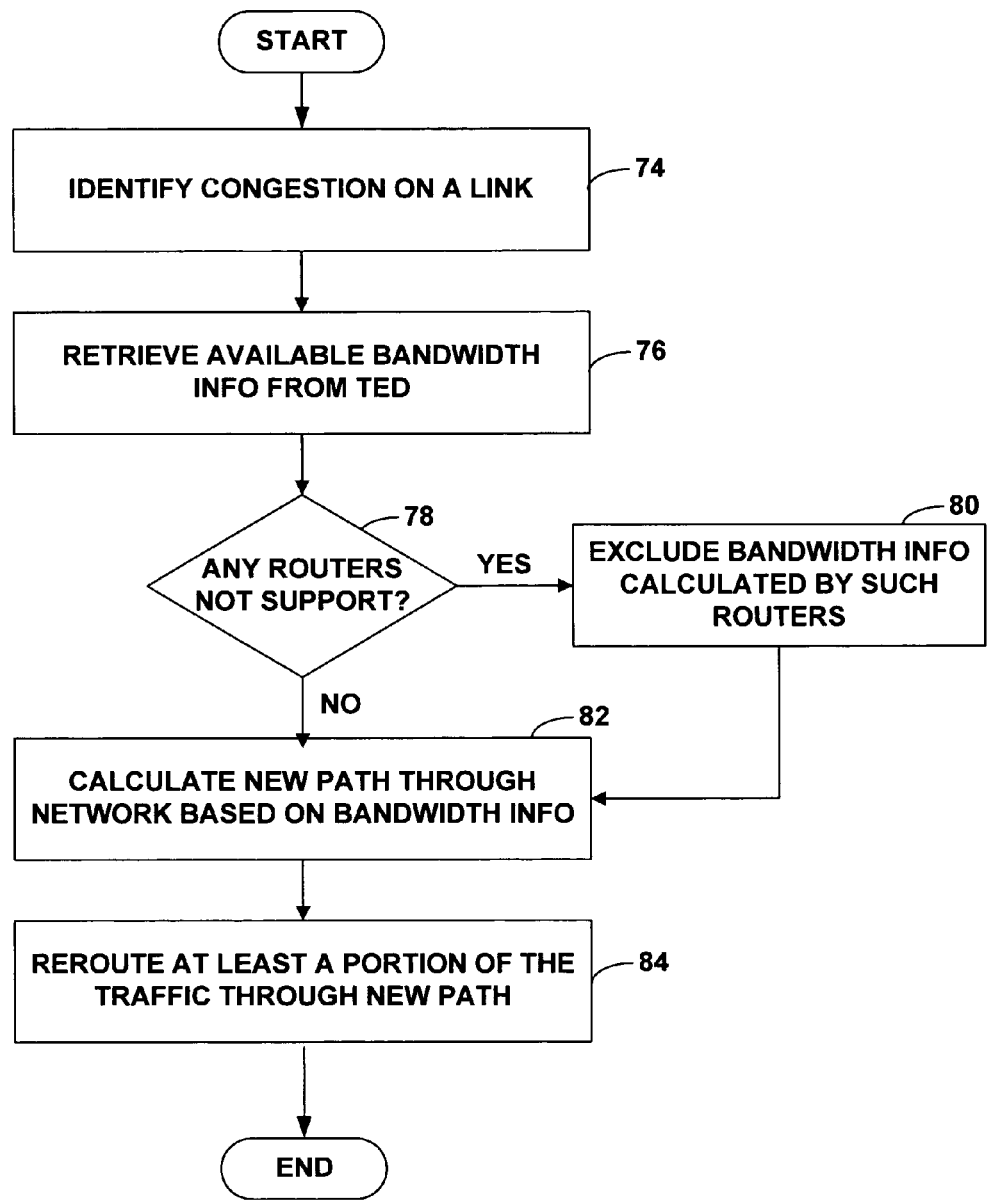
FIG. 6 is a flow diagram illustrating exemplary operation of the router using the bandwidth availability information stored in a traffic engineering data structure to relieve network link congestion.

FIG. 6 is a flow diagram illustrating exemplary operation of router, such as router 27 of FIG. 3, using the bandwidth availability information stored in TED 32 to relieve network link congestion. On an ongoing basis, router 27 receives bandwidth availability information from other routers throughout the network and updates TED 32 with the bandwidth availability information. As described above, routers within a network may exchange bandwidth availability information on an ongoing basis via a routing protocol or other mechanism suitable for exchanging such information. In this manner, the routers maintain accurate global bandwidth availability information.

A system administrator, a software agent or router 27 itself identifies congestion on a link in the network (74). The system administrator may, for example, identify that a link is congested when the amount of traffic on the link exceeds 70% of the total capacity of the link. The system administrator (or the software agent or router 27) accesses TED 32 to obtain bandwidth availability information (76). RSVP-TE determines whether any of the bandwidth availability information stored in TED 32 was calculated by a router that does not support the extended availability calculation (78). If so, RSVP-TE excludes that bandwidth availability information from identifying a new path through the network (80). For example, the system administrator (or the software agent or router 27) may consider the amount of bandwidth available on any link associated with a router not supporting the extended reservation protocol to be zero, thereby removing the link from the path selection process.

RSVP-TE identifies a new path through the network based on the bandwidth availability information (82) and updates routing information in order to reroute the traffic via the newly identified path (84). For example, RSVP-TE identifies a new path through the network in which each of the links along the path has sufficient available bandwidth to support the amount of traffic to be rerouted. In this manner, router 27 can reroute traffic from the congested link with a reduced likelihood of simply transferring the congestion to a different link.

Figure 7:
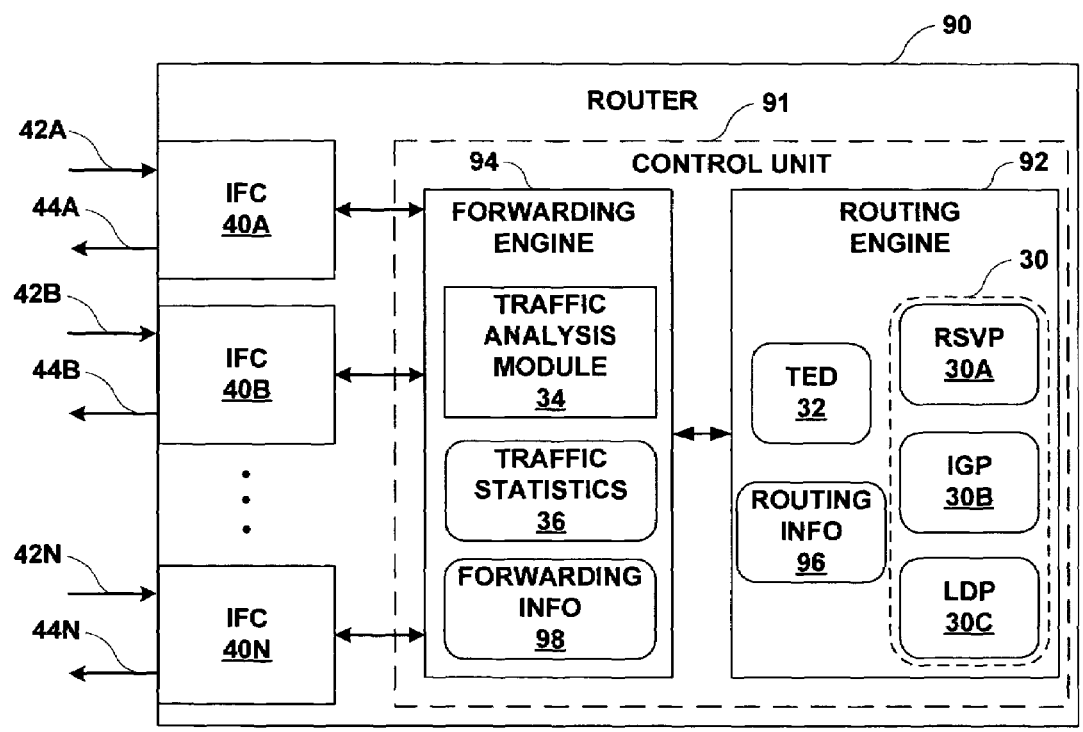
FIG. 7 is a block diagram illustrating another exemplary embodiment of a router that utilizes the extended reservation protocol to determine bandwidth availability of links within the network.

FIG. 7 is a block diagram illustrating another exemplary router 90 that utilizes an extended reservation protocol to determine bandwidth availability. Router 90 conforms substantially to router 27 of FIG. 3, but router 90 includes a control unit 91 that comprises a routing engine 92 and a forwarding engine 94. Routing engine 92 is primarily responsible for maintaining routing information 96 to reflect the current topology of a network and other network entities to which it is connected. In particular, routing engine 92 updates routing information 96 to accurately reflect the topology of the network and other entities. Protocols 30 execute within routing engine 92 to generate and maintain bandwidth availability information in TED 32. Additionally, protocols 30 executing within routing engine 92 are responsible for advertising the calculated bandwidth availability information in TED 32 as well as routing information 96 associated with router 90.

In accordance with routing information 96, forwarding engine 94 maintains forwarding information 98 that associates network destinations with specific next hops and corresponding interface ports. Accordingly, forwarding engine 94 forwards packets received from inbound links 42 to a corresponding next hop associated with destinations of the packets. In this manner, forwarding engine 94 provides the forwarding functionality of router 90. Forwarding engine 94 also includes traffic analysis module 34, which monitors the forwarding of traffic and generates traffic statistics 36. Alternatively, traffic analysis module 34 may be implemented within routing engine 92, e.g., within RSVP protocol 30A.

In one embodiment, each of forwarding engine 94 and routing engine 92 may comprise one or more dedicated processors, hardware, and the like, and may be communicatively coupled by a data communication channel. The data communication channel may be a high-speed network connection, bus, shared-memory or other data communication mechanism.

Figure 8:
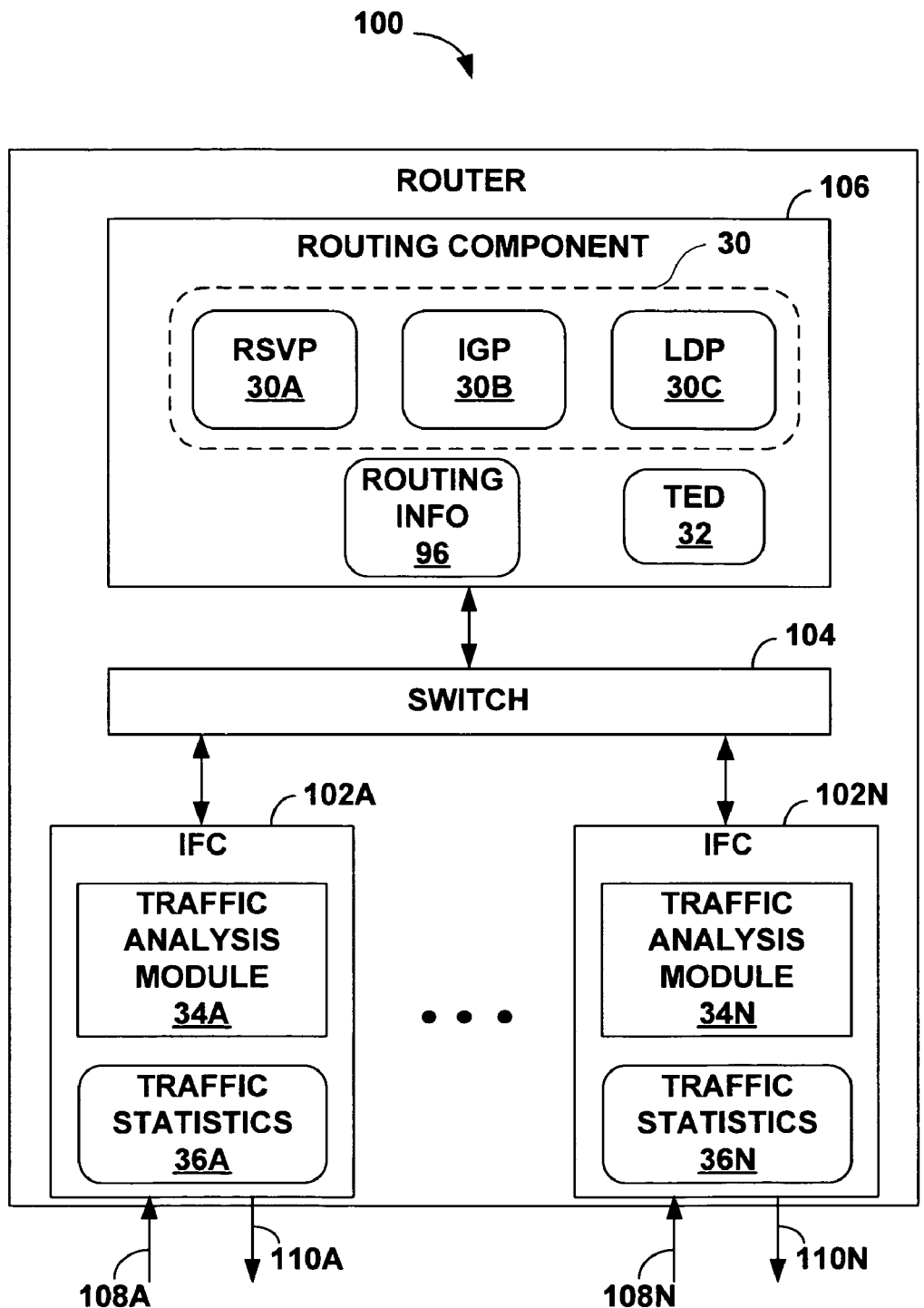
FIG. 8 is a block diagram illustrating yet another exemplary embodiment of a router that calculates and distributes bandwidth availability information in accordance with the principles of the invention.

FIG. 8 is a block diagram illustrating another exemplary router 100 that calculates and distributes bandwidth availability information in accordance with the invention. Router 100 conforms substantially to router 27 of FIG. 3, but includes interface cards (IFCs) 102A-102N ("IFCs 102") that are coupled to a routing component 106 via switch 104. IFCs 102 provide the forwarding functionality of router 100. Furthermore, IFCs 102 include traffic analysis modules 34A-34N ("traffic analysis modules 34") to maintain traffic statistics for each of outbound links 110A-110N. In this manner, the functions of collecting traffic statistics are distributed among IFCs 102. Alternatively, traffic analysis modules 34 may be implemented within routing component 106, e.g., within RSVP protocol 30A.

Various embodiments of the invention have been described. These and other embodiments are within the scope of the following claims.

The invention claimed is:

1. A method comprising:
  calculating, with a first router, an amount of bandwidth available on a link based on bandwidth reserved for the link with a resource reservation protocol and unreserved bandwidth of the link utilized by traffic associated with other types of protocols on the link;
  generating, with the first router, a routing communication that includes (i) the calculated amount of bandwidth available on the link and (ii) a data field to specify that the calculated amount of bandwidth included in the routing communication accounts for both the reserved bandwidth and the unreserved bandwidth of the link that is utilized by the traffic associated with the other types of protocols;
  transmitting the routing communication from the first router to a second router to advertise the calculated amount of available bandwidth;
  receiving the routing communication with the second router;
  updating, with the second router, a traffic engineering data structure with the bandwidth availability information included in the routing communication, wherein the traffic engineering data structure of the second router includes an amount of available bandwidth for a plurality of links, and wherein the traffic engineering data includes data indicating for each of the links whether the amount of available bandwidth accounts for both the reserved bandwidth of the link and the unreserved bandwidth of the link that is utilized by the traffic associated with the other types of protocols;

with the second router, identifying a path with sufficient bandwidth availability through the network based on the data maintained in the traffic engineering data structure; and establishing the path through the network.

2. The method of claim 1, wherein calculating an amount of available bandwidth comprises:

maintaining reservation data indicative of bandwidth reservations made via the resource reservation protocol;

calculating the bandwidth usage by the traffic with a traffic analysis module; and calculating the amount of bandwidth available on the link using the reservation data and the bandwidth usage by the traffic.

3. The method of claim 2, wherein calculating the bandwidth usage by the traffic comprises averaging bandwidth usage of the link over a period of time.

4. The method of claim 2, wherein maintaining reservation data comprises storing a total amount of bandwidth reserved on the link via the bandwidth reservations.

5. The method of claim 2, wherein calculating the amount of bandwidth available on the link comprises subtracting an amount of bandwidth reserved on the link and the calculated bandwidth usage by the traffic from a total capacity of the link.

6. The method of claim 2, wherein calculating bandwidth usage by the traffic comprises calculating bandwidth usage by current traffic routed via one of a Label Distribution Protocol (LDP protocol) and an Internet Protocol (IP protocol).

7. The method of claim 1, wherein the resource reservation protocol comprises the Resource Reservation Protocol with Traffic Engineering extensions (RSVP-TE).

8. The method of claim 1, wherein establishing the path comprises establishing a label switch path (LISP) through the network.

9. The method of claim 1, wherein identifying a path with sufficient bandwidth availability comprises receiving input identifying the path from a system administrator or a software agent.

10. The method of claim 1, further comprising excluding, with the second router, at least a portion of the received bandwidth availability information when identifying the path through the network when the data field specifics that the received bandwidth availability information does not account for unreserved bandwidth utilized by the traffic on the one or more links.

11. The method of claim 1, wherein transmitting the routing communication comprises transmitting the routine communication in accordance with a link-state protocol that specifies the bandwidth availability as link-state information associated with the link.

12. The method of claim 1, wherein the link is a physical link or a virtual link.

13. A network device comprising:

a routing protocol executing within a control unit of the network device, wherein the routing protocol receives a routing communication from another network device of a network, the routing communication including (i) a calculated amount of bandwidth available on a link and (ii) a data field to specify that the calculated amount of bandwidth included in the routing communication accounts for both reserved bandwidth associated with the link and unreserved bandwidth utilized by traffic on the link;

a traffic engineering data structure updated by the routing protocol in response to the routing communication, wherein the traffic engineering data structure stores the bandwidth availability information included in the routing communication, wherein the traffic engineering data structure includes an amount of available bandwidth for a plurality of links, and wherein the traffic engineering data includes data indicating for each of the links whether the amount of available bandwidth in the data structure accounts for both the reserved bandwidth of the link and the unreserved bandwidth of the link; and a resource reservation protocol executing within the control unit, wherein the resource reservation protocol is configured to identify a path through the network with sufficient bandwidth availability based on the data maintained in the traffic engineering data structure.

14. The network device of claim 13, further comprising a traffic statistics database that stores bandwidth usage by the traffic for a link coupled to the network device, wherein the resource reservation protocol calculates the amount of bandwidth available on the link using based on the reserved bandwidth associated with the link and the unreserved bandwidth utilized by at least a portion of traffic on the link as indicated by the traffic statistics database.

15. The network device of claim 14, wherein the resource reservation protocol includes a traffic analysis module that calculates the bandwidth usage by the traffic and updates the traffic statistics database.

16. The network device of claim 14, wherein the control unit receives traffic statistics from an external traffic analysis device and updates the traffic statistics database.

17. The network device of claim 13, wherein the resource reservation protocol calculates the amount of bandwidth available on the link coupled to the network device by subtracting the amount of bandwidth reserved on the link and the calculated unreserved bandwidth utilized by the traffic from a total capacity of the link.

18. The network device of claim 13, wherein the resource reservation protocol comprises a Resource Reservation Protocol with Traffic Engineering extensions (RSVP-TE) and the traffic utilizing the unreserved bandwidth comprises Label Distribution Protocol (LDP) traffic or Internet Protocol (IP) traffic.

19. The network device of claim 13, wherein the routing protocol comprises an Interior Gateway Protocol (IGP) and advertises the available bandwidth as link state information associated with the link.

20. The network device of claim 19, wherein the IGP comprises the Open Shortest Path First (OSPF) protocol or the Intermediate System—Intermediate System (ISIS) protocol.

21. The network device of claim 13, wherein the resource reservation protocol establishes the path through the network.

22. The network device of claim 21, wherein the resource reservation protocol identifies the path in response to input received from one of a system administrator or a software agent.

23. The network device of claim 21, wherein the resource reservation protocol comprises an RSVP-TE process executing on the control unit that establishes a label switch path (LSP) through the network.

24. The network device of claim 21, wherein when identifying the path with sufficient bandwidth availability, the resource reservation protocol excludes the bandwidth availability information from the devices of the network not supporting that capability when identifying the path through the network.

25. The network device of claim 13, wherein the link associated with the received routing communication is a physical link or a virtual link.

26. A computer-readable medium comprising instructions that cause a processor to:
   calculate an amount of bandwidth available on a link, wherein the calculation accounts for reserved bandwidth of the link and network traffic on the link that utilizes unreserved bandwidth;
   generate a routing communication that includes (i) the calculated amount of bandwidth available on the link and (ii) an indicator to specify that the calculated bandwidth included in the communication accounts for unreserved bandwidth utilized by the traffic on the link;
   transmit the routing communication to advertise the amount of bandwidth available on the link;
   receive a second routing communication, wherein the second routing communication includes (i) a calculated amount of bandwidth available on a second link and (ii) an indicator to specify that the calculated bandwidth included in the communication accounts for unreserved bandwidth utilized by the traffic on the second link;
   update a traffic engineering data structure with the bandwidth availability information included in the second routing communication, wherein the traffic engineering data structure of includes an amount of available bandwidth for a plurality of links, and wherein the traffic engineering data includes data indicating for each of the links whether the amount of available bandwidth accounts for both the reserved bandwidth of the link and the unreserved bandwidth of the link that is utilized by the traffic associated with the other types of protocols;
   identify a path with sufficient bandwidth availability through the network based on the data maintained in the traffic engineering data structure; and
   establish the path through the network.

27. The computer-readable medium of claim 26, further comprising instructions that cause the processor to:
   maintain reservation data indicative of bandwidth reservations made via a reservation protocol;
   calculate the bandwidth usage by the traffic not associated with the reserved bandwidth with a traffic analysis module; and
   calculate the amount of bandwidth available on the link using the reservation data and traffic information.

28. The computer-readable medium of claim 27, wherein the instructions calculate the bandwidth usage by the traffic by averaging bandwidth usage by the traffic over a period of time.

29. The computer-readable medium of claim 26, wherein the instructions maintain the reservation data by storing a total amount of bandwidth reserved on the link via the bandwidth reservations.

30. The computer-readable medium of claim 26, wherein the instructions calculate the amount of bandwidth available on the link by subtracting an amount of bandwidth reserved on the link and the calculated bandwidth usage by the traffic from a total capacity of the link.

31. The computer-readable medium of claim 26, further comprising instructions that cause the processor to:
   receive advertised bandwidth availability information that indicates an amount of bandwidth available on links; and
   update a traffic engineering data structure with the received bandwidth availability information.

32. The computer-readable medium of claim 31, further comprising instructions that cause the processor to
   reroute traffic through the network via the identified path.

33. The computer-readable medium of claim 32, further comprising excluding at least a portion of the received bandwidth availability information when identifying the path through the network when the indicator specifies that the received bandwidth availability information does not account for unreserved bandwidth utilized by the traffic on the one or more links.

34. The computer-readable medium of claim 26, wherein the link is a physical link or a virtual link.

* * * * *